Patented May 14, 1940

2,200,306

UNITED STATES PATENT OFFICE 2,200,306

COMPOUND HAVING REACTIVE METHYLENE GROUPS

Wilhelm Schneider and Alfred Fröhlich, Dessau, Germany, assignors, by mesne assignments, to General Aniline & Film Corporation, New York, N. Y., a corporation of Delaware No Drawing. Application July 21, 1938, Serial No. 220,502. In Germany July 23, 1937

6 Claims. (Cl. 260—310)

The present invention relates to the preparation of derivatives of acylacetic acid ester, which contain an active methylene group, and more particularly to such derivatives as contain an aliphatic chain of more than 9 carbon atoms.

It has hitherto not been possible to produce on a technical scale bodies having active methylene groups, such as for instance acylacetic acid ester derivatives, pyrazolones or isoxazolones, which are substituted in the carbon atom next to the active methylene group by a carbon chain of at least 9 carbon atoms. The yields obtained according to the processes, which have hitherto become known, were so unsatisfactory that the practical application of these processes was impossible.

It is therefore an object of the present invention to provide a process of producing compounds of the character described, which gives satisfactory results.

A further object of the invention is the provision of a process which leads to hitherto unknown and unaccessible intermediate and final products.

A further object of the invention resides in the provision of a new kind of dyestuff intermediate products for the production of fat-soluble dyes.

Still another object of the invention is the provision of a new kind of dyestuff components fast to diffusion for the color photographic processes known as "color forming development".

Further objects of the invention will become apparent as the description proceeds.

We have found that compounds having active methylene groups, which carry at the carbon atom next to the reactive methylene group a straight branched or interrupted carbon chain containing at least 9 carbon atoms, may be obtained with an excellent yield by reacting an acid chloride having at least 10 carbon atoms on sodium malonic acid ester and causing the acyl malonic acid ester to form compounds with an active methylene group. The acyl malonic acid esters obtained as intermediate products in this reaction have hitherto not been known. Contrary to the known acyl malonic acid esters of the lower members of the fatty acid series the acyl malonic acid esters from higher fatty acid chlorides are very sensitive to water so that precautions must be taken during their production and purification to exclude all traces of water.

Fatty acid chlorides which are suitable for the purpose of the present invention are, for instance, undecylic chloride, undecylenic chloride, lauric chloride, palmitic chloride, oleic chloride, stearic chloride, ricinoleic chloride, also chlorides of acids having branched or interrupted carbon chains, for example octadecylphenyl-4-carboxylic acid or 1-dodecylphenyl-4-carboxylic acid.

The reaction of fatty acid chlorides of high molecular weight on the sodium compound of diethyl malonate is preferably conducted in an indifferent solvent.

The acylmalonic acid esters obtained may be condensed easily with hydrazine and its derivatives to produce the corresponding pyrazolones which carry in the 3-position a carbon chain as a substituent. If, instead of the hydrazine, hydroxylamine is used, there is obtained a substituted isoxazolone. Bodies with active methylene-groups may also be produced by condensing the acylmalonic acid esters with aromatic primary amines.

The reaction proceeds according to the following scheme:

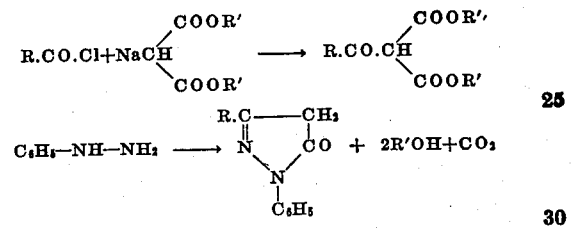

R being an aliphatic radical consisting of a chain of at least 9 carbon atoms, whereas R' may be, for instance, ethyl or another alkyl radical.

The compounds containing reactive methylene groups obtained according to the process hereinbefore described are very stable and are especially valuable as dyestuff intermediate products for the production of fat-soluble dyestuffs. Furthermore they are suitable as dyestuff components for use in color photography. In this case the dyestuff components are incorporated in silver halide emulsions from which they cannot be removed by washing with water. Since these dyestuff components are soluble in aqueous liquids it is possible to incorporate them in the emulsion in dissolved form. By means of an aromatic amino developer a colored picture may be developed after exposure in situ with the silver picture. On the other hand the dyestuff may be formed by azo-coupling or by simple oxidation from the dyestuff components.

The following examples illustrate the invention:

*Example 1.*—1 mol of malonic acid diethyl ester is dissolved in 1 liter of benzene and 1 mol of sodium is added in the form of a thin wire. The mixture is boiled for 20 hours and the resultant solution of sodium malonic acid diethyl ester is mixed with 1 mol of stearic acid chloride. To this solution of stearyl malonic acid diethyl ester is added a solution of 1 mol phenyl hydrazine-3-carboxylic acid in 1½ liters of acetic acid of 50 per cent strength, the mixture being kept boiling all the time. The mixture is heated for 4 hours when the benzene is distilled off, whereupon 500 cc. of concentrated hydrochloric acid are added and after a further heating for 4 hours on the steam-bath the mixture is cooled, filtered and the reaction product crystallized from glacial acetic acid or acetone, methanol or the like. The product is obtained in white crystals. Its formula is 1-(3-carboxyphenyl)-3-heptadecyl pyrazolone.

*Example 2.*—The benzene solution of diethyl stearylmalonate obtained as described in Example 1 is mixed at its boiling point with a solution of 1 mol of phenylhydrazine-4-sulfonic acid and 3 mols of sodium acetate in 1 liter of water, and the mixture is heated for 4 hours while the benzene is being distilled off. The residue is acidified with ½ liter of concentrated hydrochloric acid and further heated for 4 hours. The 1-phenyl-3-heptadecyl-pyrazolone-4'-sulfonic acid thus obtained is cooled, filtered and recrystallized from glacial acetic acid.

*Example 3.*—The benzene solution of diethylstearylmalonate obtained as described in Example 1 is mixed at its boiling point with a solution of 1 mol of phenylhydrazine-3-sulfonic acid and 3 mols of sodium acetate in 1 liter of water, and the whole is heated for 4 hours while the benzene is being distilled off. The residue is acidified with ½ liter of concentrated hydrochloric acid and heated for a further 4 hours. The 1-phenyl-3-heptadecyl-pyrazolone-3'-sulfonic acid is filtered from the cooled solution and recrystallized from glacial acetic acid.

*Example 4.*—1 mol of diethyl malonate is dissolved in 1 liter of benzene, 1 mol of fine sodium wire is added and the whole is heated for 20 hours to boiling and then mixed with 1 mol of lauric chloride. This benzene solution of diethyl laurylmalonate is mixed at its boiling point with a solution of 1 mol phenylhydrazine-3-carboxylic acid in 1½ liters of acetic acid of 50 per cent strength. After heating for 4 hours, during which period the benzene is distilled off, 500 cc. of concentrated hydrochloric acid are added and the mixture is heated for a further 4 hours on the steam bath. After cooling and filtering the product is recrystallized from glacial acetic acid or acetone or methanol to obtain the 1-phenly-3-undecylpyrazolone-3'-carboxylic acid in the form of white crystals.

What we claim is:

1. A process of producing a compound having a reactive methylene group and at the carbon atom next to the methylene group an aliphatic carbon chain of at least 9 carbon atoms, which process comprises reacting a monobasic aliphatic acid chloride with a carbon chain of at least 10 carbon atoms and containing no further reactive substituents on a sodium malonic acid ester, and reacting on the acylmalonic acid ester thus formed a compound having at least one primary amino group and being selected from the group consisting of hydrazine, an organic derivative of hydrazine, hydroxylamine, an organic derivative of hydroxylamine and an aromatic amine.

2. A process of producing a compound having a reactive methylene group and at the carbon atom next to the methylene group an aliphatic carbon chain of at least 9 carbon atoms, which process comprises reacting a monobasic aliphatic acid chloride with a carbon chain of at least 10 carbon atoms and containing no further reactive substitutes on a sodium malonic acid ester, and reacting on the acylmalonic acid ester thus formed phenylhydrazine sulfonic acid.

3. A compound having the following general formula

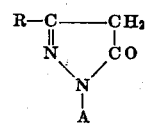

wherein R is an aliphatic radical comprising a carbon chain of at least 9 carbon atoms, and A is aryl.

4. 1-(3-carboxyphenyl)-3-heptadecylpyrazolone.

5. 1-phenyl-3-heptadecylpyrazolone-4'-sulfonic acid.

6. 1-phenyl-3-undecylpyrazolone-3'-carboxylic acid.

WILHELM SCHNEIDER.
ALFRED FRÖHLICH.